US012466634B2

(12) United States Patent
Bodet et al.

(10) Patent No.: US 12,466,634 B2
(45) Date of Patent: Nov. 11, 2025

(54) ON/OFF TYPE DIFFUSER

(71) Applicant: LINDAL FRANCE SAS, Val de Briey (FR)

(72) Inventors: Hervé Bodet, Verdun (FR); Eric Gaillard, Dieue-sur-Meuse (FR)

(73) Assignee: LINDAL FRANCE SAS, Val de Briey (FR)

( * ) Notice: Subject to any disclaimer, the term of this patent is extended or adjusted under 35 U.S.C. 154(b) by 315 days.

(21) Appl. No.: 18/007,135

(22) PCT Filed: Jul. 26, 2021

(86) PCT No.: PCT/EP2021/070880
§ 371 (c)(1),
(2) Date: Jan. 27, 2023

(87) PCT Pub. No.: WO2022/023282
PCT Pub. Date: Feb. 3, 2022

(65) Prior Publication Data

US 2025/0100780 A1 Mar. 27, 2025

(30) Foreign Application Priority Data

Jul. 30, 2020 (FR) ....................................... 2008128

(51) Int. Cl.
*B65D 83/22* (2025.01)
*B05B 11/00* (2023.01)
*B65D 83/206* (2025.01)

(52) U.S. Cl.
CPC .......... *B65D 83/22* (2013.01); *B05B 11/0027* (2013.01); *B65D 83/206* (2013.01)

(58) Field of Classification Search
CPC .... B65D 83/22; B65D 83/206; B05B 11/0027
See application file for complete search history.

(56) References Cited

U.S. PATENT DOCUMENTS 2,573,624 A 10/1951 Svendsen
5,158,206 A * 10/1992 Kobayashi ........... B65D 47/261 222/402.11

(Continued)

FOREIGN PATENT DOCUMENTS

EP 2004538 12/2008
WO 2007120570 A2 10/2007

OTHER PUBLICATIONS

International Search Report and Written Opinion dated Nov. 3, 2021 in corresponding application No. PCT/EP2021/070880; w/ English partial translation and partial machine translation (total 20 pages).

*Primary Examiner* — Frederick C Nicolas
(74) *Attorney, Agent, or Firm* — Seckel IP, PLLC

(57) ABSTRACT

The dispensing device (1) fora pressurized container has a base (10) and a cap (20). The cap (20) is mounted on the base (10) so that it is rotatable between an unlocked position and a locked position. An indicator indicate the relative position of the cap (20) with respect to the base (10). The indicator is constituted by a notch (113) made in the base (10) and by an information wall (24) placed in the cap (20), the information wall (24) being located behind the notch regardless of the relative position of the cap. The information wall has an unlocked position mark (241) and a locked position mark (242), the first mark facing the notch when the cap is in the unlocked position and the second mark facing the notch when the cap is in the locked position.

21 Claims, 4 Drawing Sheets

(56) References Cited

U.S. PATENT DOCUMENTS

| | | | | |
|---|---|---|---|---|
| 5,484,088 | A | 1/1996 | Martin | |
| 6,302,302 | B1 * | 10/2001 | Albisetti | B65D 83/20 222/402.11 |
| 6,523,722 | B1 * | 2/2003 | Clark | B65D 83/22 222/402.11 |
| 6,758,373 | B2 * | 7/2004 | Jackson | B65D 83/206 222/402.11 |
| 6,971,552 | B2 * | 12/2005 | Meshberg | B65D 83/40 222/402.11 |
| 7,530,476 | B2 * | 5/2009 | Downey | B65D 83/228 222/153.04 |
| 9,205,973 | B2 * | 12/2015 | Decea | B65D 83/222 |
| 9,260,237 | B1 * | 2/2016 | Brace | B65D 43/26 |
| 9,505,546 | B2 * | 11/2016 | Arora | B65D 83/22 |
| 10,577,169 | B2 * | 3/2020 | Bodet | B65D 83/22 |
| 10,669,082 | B1 * | 6/2020 | Meshberg | B65D 43/16 |
| 2005/0184093 | A1 * | 8/2005 | Brunerie | B65D 83/206 222/153.11 |
| 2007/0235474 | A1 | 10/2007 | Downey et al. | |
| 2017/0001208 | A1 | 1/2017 | Barenhoff et al. | |
| 2019/0201639 | A1 * | 7/2019 | Lutz | A61M 15/009 |

* cited by examiner

[Fig. 4]
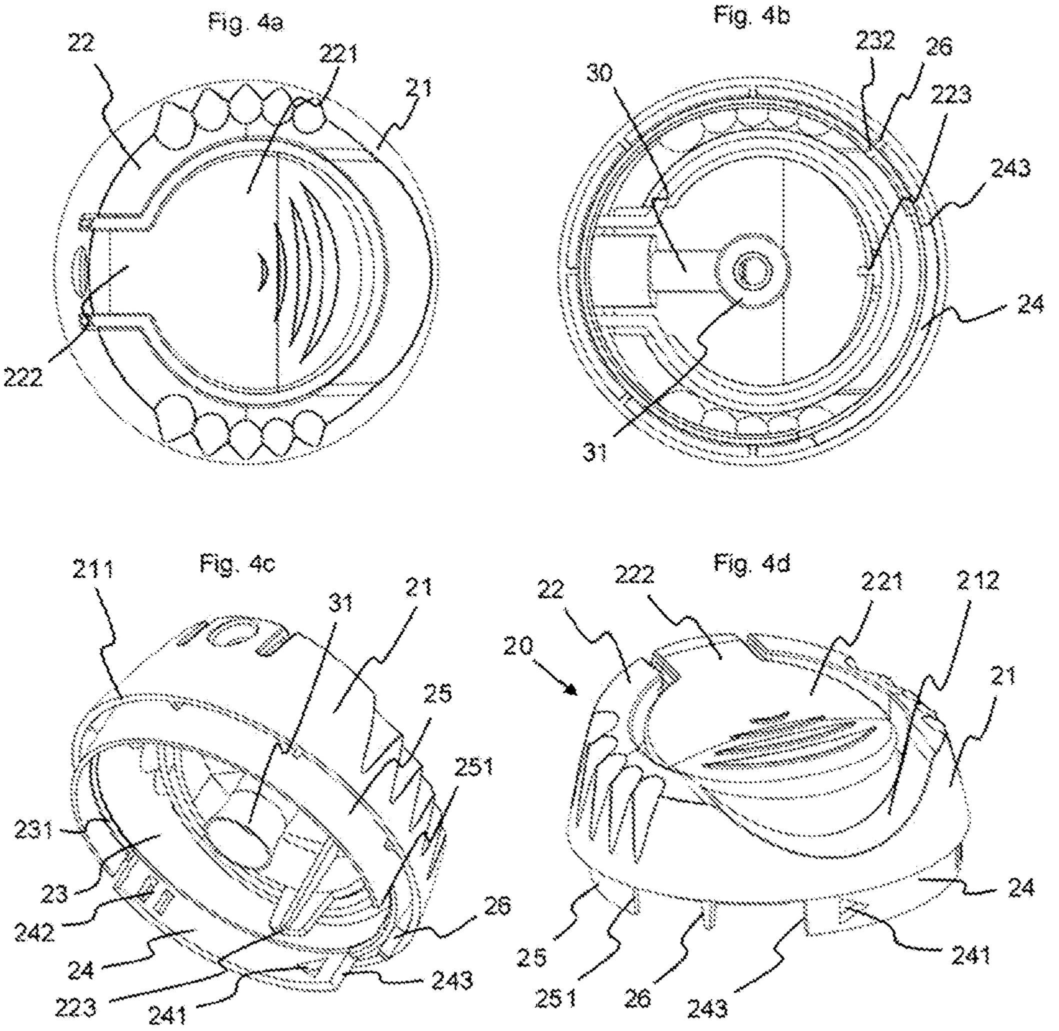
[Fig. 5]
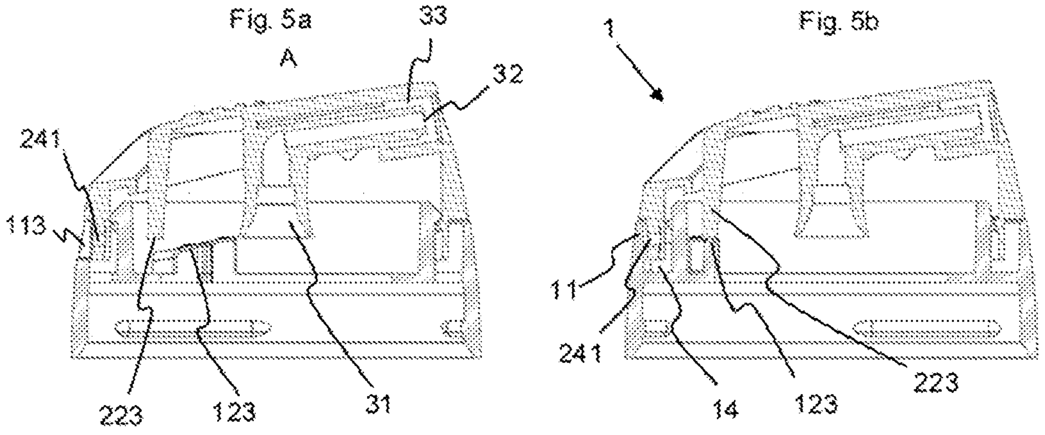

[Fig. 6]
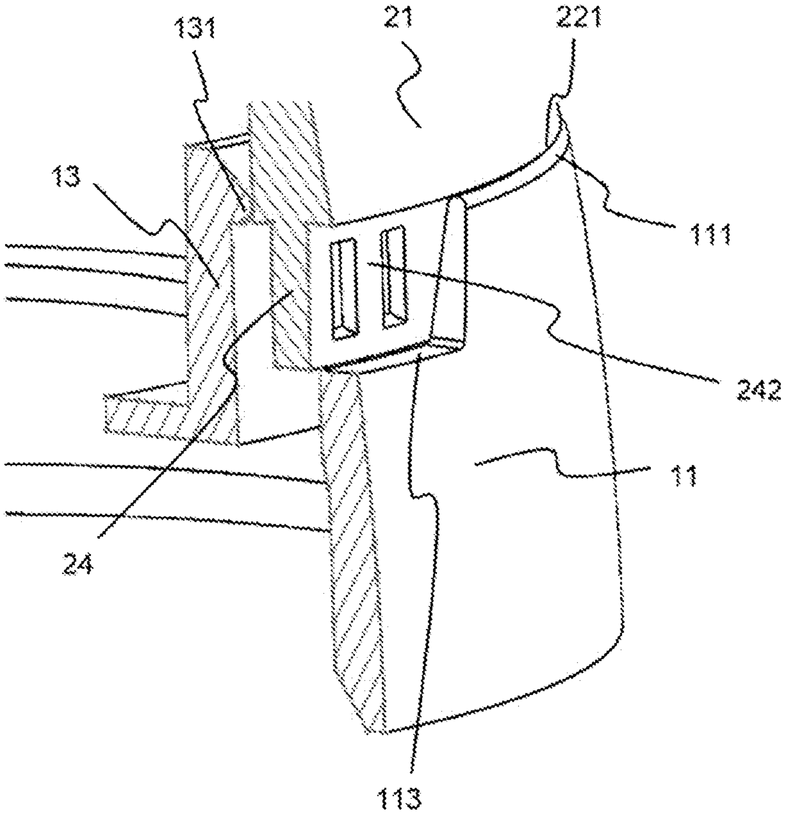

ON/OFF TYPE DIFFUSER

TECHNICAL FIELD

The invention relates to an ON/OFF type dispensing actuator for dispensing a product coming from an extraction device of a container, such as a valve of a pressurized container. It comprises in particular a base, a cap provided with a finger pad allowing the extraction device of the container to be actuated, and an outlet conduit provided at a first end with an actuating member intended to cooperate with the extraction device of the container when the finger pad is actuated, and at the second end with an outlet opening. The cap is mounted on the base so that it is rotatable relative to the base around a main axis between an unlocked position in which the actuating member of the outlet conduit can open the extraction device of the container when the finger pad is actuated, and a locked position in which the actuating member of the outlet conduit cannot open the extraction device even when the finger pad is actuated. Indication means are provided to indicate to the user the relative position of the cap with respect to the base.

BACKGROUND OF THE INVENTION

Such ON/OFF type actuators are commonly used, in particular to actuate pressurized containers such as aerosol dispensers or foam dispensers. To indicate to the user the locked or unlocked position of the cap, it is common to place on the base and on the cap, on the one hand, a pair of marks symbolizing the locked position and the unlocked position, and on the other hand, an index which is alternately aligned with one mark or the other. However, the marks indicating the locked and unlocked positions are not always explicit and are often difficult for the user to visualize.

The object of the invention is to develop the indication means so that they are more easily visible and identifiable by the user. Another objective is to allow the use of the indication means to provide other information to the consumer.

SUMMARY OF THE INVENTION

According to the invention, the indicating means are constituted by a notch made in one of the two parts among the base and the cap, and by an information wall placed in the other of the two parts among the cap and the base, so that the information wall is located directly behind the notch, inside the dispensing device, regardless of the relative position of the cap with respect to the base between the locked position and the unlocked position. The information wall has a first unlocked position mark and a second locked position mark, the first mark facing the notch when the cap is in the unlocked position and the second mark facing the notch when the cap is in the locked position. Compared to index systems, this embodiment has the advantage of being more visible and more easily recognizable.

The notch can be made in an outer skirt of the base or of the cap, preferably in an edge of said skirt directed towards the part provided with the information wall. Instead of a notch made on the edge of the skirt, it could be given the shape of an opening made farther from the edge in the skirt.

The marks can be printed, molded or engraved on the information wall.

It is also possible for the marks to pass through the entire thickness of the information wall so that the eye can see what is behind the information wall through the mark aligned with the notch. In this case, preferably, the part which is provided with the notch is equipped with an inner wall which extends at least behind the notch, leaving a gap between the notch and the inner wall, gap in which the information wall takes place. In this way, the marks of the information wall reveal the inner wall behind them when they are aligned with the notch. The effect is all the more remarkable when the color of the information wall is in contrast relative to the color of the inner wall. By choosing certain pairs of colors, it is possible to provide the user with additional information on the product contained in the container. For example, green can be selected for the information wall and white for the inner wall (or vice versa) to indicate that the actuator is made with recyclable materials. It is also possible to choose a certain tone in a color gradient to indicate the concentration of the product in a range of products, the product with the lowest dosage having a lighter color than the product with the highest dosage. For example, it will be possible to choose a light pink tone for the weakest dosage, a darker pink for an intermediate dosage, and a red for the strongest dosage.

The outlet conduit can be fixed either to the inner face of the finger pad or to the base.

Limiting means may be provided to limit the relative rotation of the cap with respect to the base to the two extreme positions defined by the locked position and the unlocked position. This ensures that the cap cannot be moved beyond the two extreme positions.

The rotation limiting means can comprise, inter alia, a first end of the information wall and an abutment made in the part which is provided with the notch, the first end of the information wall bearing against the abutment when the cap is in the locked or unlocked position.

The rotation limiting means can also be designed so that the part provided with the information wall is equipped with a guide wall extending in another angular sector relative to the main axis than the information wall, the end of the guide wall facing the first end of the information wall serving as rotation limiting means. Said end of the guide wall bears against the abutment when the cap is in the unlocked or locked position.

The actuating member of the outlet conduit can be constituted by an endpiece configured to cooperate with the rod of the stem of a valve of the male type or the seat of a valve of the female type of a pressurized container, in particular of an aerosol dispenser or a foam dispenser.

It is preferable to provide blocking means to block the relative rotation of the cap with respect to the base when the cap is in the unlocked position and/or in the locked position. These blocking means can be constituted by one or more extra thicknesses made on one of the two parts, preferably on the part provided with the information wall, and one or more extra thicknesses made on the other of the two parts, preferably on the part provided with the notch. A n extra thickness of the first part cooperates with an extra thickness of the second part to retain the cap in the unlocked or locked position.

The dispensing device is designed to be fixed to the container, preferably by the base. To this effect, it can be provided with fixing means.

BRIEF DESCRIPTION OF THE DRAWINGS

The invention is described in more detail with the aid of an embodiment presented in the figures, which show:

FIG. 4: The cap of the actuator of FIG. 1, seen (a) from above, (b) from below, (c) in perspective from below and (d) in perspective from above;

FIG. 5: A transverse cross-sectional view of the actuator at the outlet conduit, (a) in the unlocked position and (b) in the locked position of the actuator;

FIG. 6: An enlarged view of the information means in the locked position of the actuator.

DETAILED DESCRIPTION OF PARTICULAR EMBODIMENTS

Figure 1A:
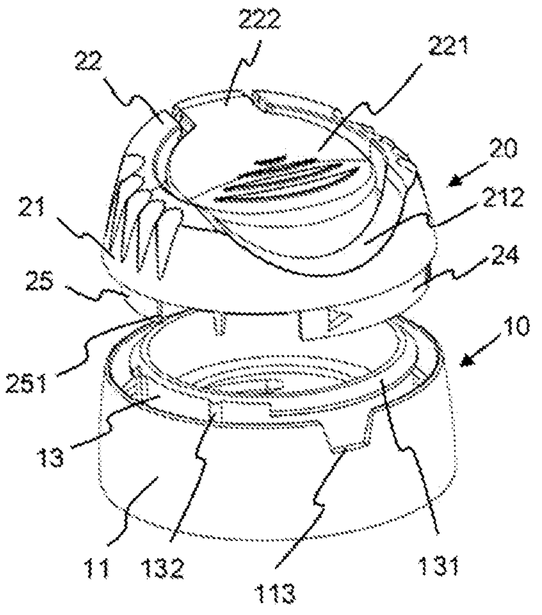
FIG. 1: Exploded views of an actuator provided with information means according to the invention, (a) in the unlocked position and (b) in the locked position.
Figure 1B:
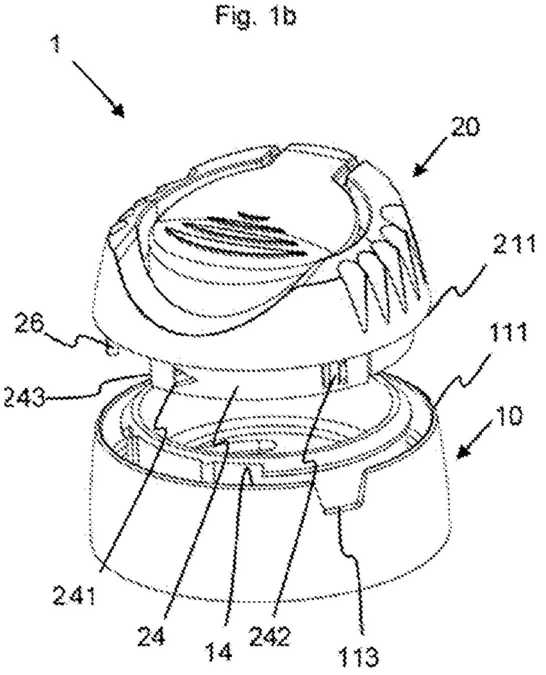
Figure 2A:
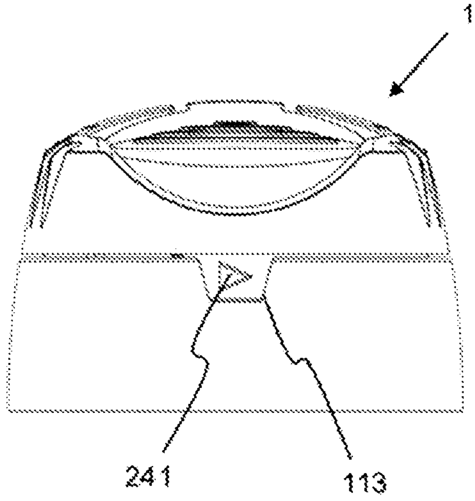
FIG. 2: Side views of the actuator of FIG. 1, (a) in the unlocked position and (b) in the locked position.
Figure 2B:
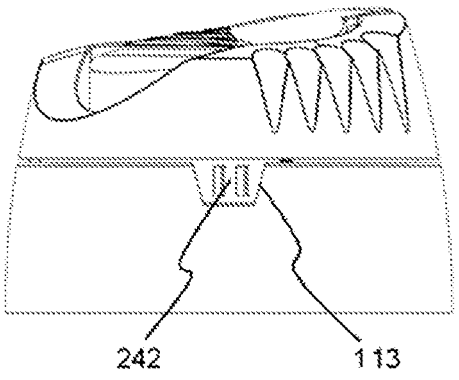
Figure 3A:
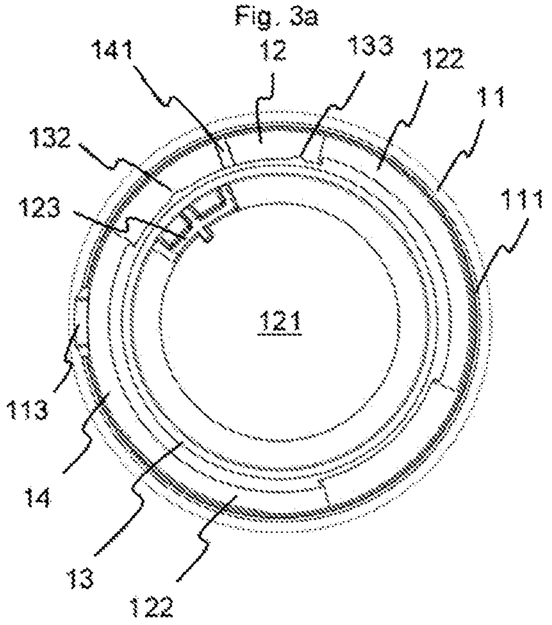
FIG. 3: The base of the actuator of FIG. 1, seen (a) from above, (b) in lateral cross-section, (c) in perspective from below, and (d) in perspective from above.
Figure 3B:
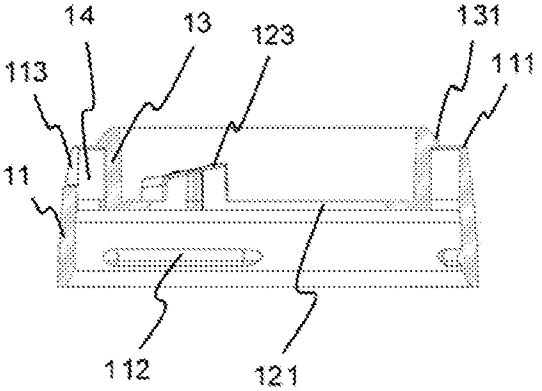
Figure 3C:
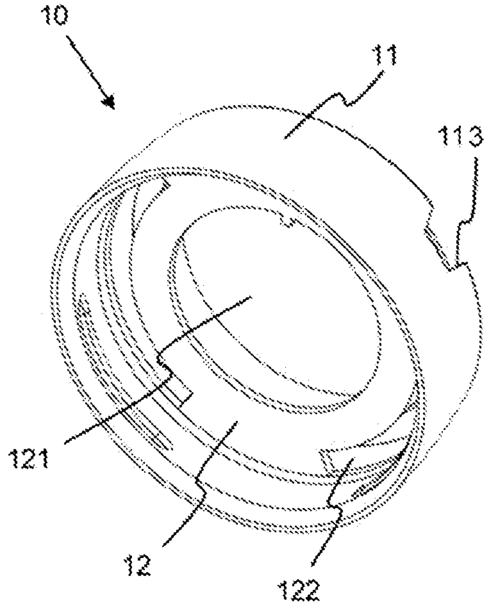
Figure 3D:
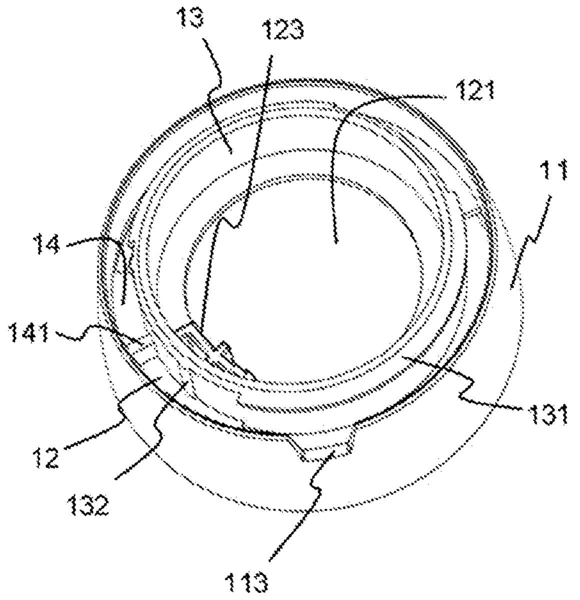

The invention relates to an information device for an ON/OFF type actuator (1) intended for a dispensing device of product contained in a container, such as the valve of an aerosol dispenser or a manual pump of a cosmetic product.

The actuator is constituted by at least two parts which can rotate relative to each other around a main axis (A), between an unlocked position in which the actuator can cooperate with the dispensing device on which it is mounted, and a locked position in which it cannot cooperate with the extraction device. To simplify the description, reference will be made in the following to an actuator intended for an aerosol dispenser closed by a valve of the male type provided with a stem whose rod projects from a valve cup. The person skilled in the art will understand that with very few modifications, the same actuator can be used for a valve of the female type, and more generally, the invention can be applied, inter alia, to an actuator that can be mounted on the distribution rod of a manual pump, such as they are known in soap dispensers, for example.

The actuator (1) presented in the figures is constituted by a base (10) intended to be fixed to the cup or to the can of the aerosol dispenser, a cap (20) provided with a finger pad (221) for actuating the valve, and an outlet conduit (30). The cap can pivot relative to the base between an open position in which the finger pad can be depressed to actuate the valve and a locked position in which it is not possible to depress the finger pad to actuate the valve.

The base (10) is provided with a skirt (11) of tubular shape with a circular upper edge (111). A radial wall (12) of annular shape extends from the inner face of the skirt, preferably from its central part, towards the center of the actuator, leaving a passage opening (121). This passage opening leaves a free passage for the rod of the stem of the valve and/or the lower end of the outlet conduit of the actuator. A tubular inner wall (13) of circular cross-section protrudes upwards from the radial wall. The skirt (11), the passage opening (121) of the radial wall, and the inner wall (13) are concentric around the main axis (A). To lighten the actuator and avoid shrinkage cavities, it is possible to provide through-openings (122) in the radial wall, between the skirt (11) and the inner wall (13). Fixing means (112) are provided on the inner face of the skirt to fix the base (10) to the valve or the can of an aerosol dispenser. A notch (113) is made in the upper edge (111) of the skirt.

The cap (20) comprises a skirt (21) which is constituted by a tubular wall and which is at least partially closed at the top by a top wall (22). The skirt (21) of the cap has, opposite from the top wall, a lower edge (211). In the example presented here, the upper edge (111) of the skirt of the base and the lower edge (211) of the skirt of the cap have substantially the same shape, and more generally, the shapes of the two skirts are chosen to form, at least in the unlocked and/or locked position, a substantially continuous envelope. In the present example, the two skirts have a substantially circular cross-section, at least at their interface.

The top wall (22) of the cap is provided with the finger pad (221) which is articulated to the rest of the top wall by a strip of material (222) constituting an elastic hinge.

The outlet conduit (30) is fixed to the inner face of the finger pad (221). The outlet conduit (30) is provided at a first end with an actuating member intended to cooperate with the rod of the stem of a valve and having the form of an endpiece (31). At the other end, the outlet conduit is provided with an outlet opening (32). The outlet opening (32) can be surrounded by an annular channel (33) in which a spray nozzle can be placed. Depending on requirements, the outlet opening (32) can emerge in the top wall (22) of the cap or, as in the case presented here, in the skirt (21) of the cap, in which case the outlet conduit is divided into a vertical section starting with the mouthpiece and an inclined section, generally substantially horizontal, ending with the outlet opening.

In a variant embodiment not shown, the outlet conduit can be fixed to the base. In this case, the outlet conduit is divided into a vertical section and an inclined section, generally approximately horizontal, and the finger pad (221) comes to press on the top of the vertical section. If the outlet opening (32) of the outlet conduit is located at the level of the cap, the cap must be provided with a passage opening aligned with the outlet opening (32) in the open position.

The skirt (21) of the cap has, opposite from the outlet opening (32), a depression (212) allowing the user's finger to press on the finger pad while remaining flat on it.

The cap is further provided with an inner wall (23) having a circular cross-section, which extends towards the base, from the skirt (21) in the portion located below the outlet opening (32) of the outlet conduit, or from the top wall in the depression area (212).

The cap is rotatably placed on the base. To this effect, retaining means are provided, one portion (131) of which is placed at the top of the outer face of the inner wall (13) of the base, and the other portion (231) in the lower portion of the inner face of the inner wall (23) of the cap. In the present example, the retaining means are latching means comprising, on the one hand, two segments around the periphery of the inner wall (13) of the base, and on the other hand, a segment over a large portion of the periphery of the inner wall (23) of the cap.

An information wall (24) is placed inside the skirt of the cap, in the extension of the inner wall (23). It has a transverse cross-section in the shape of circular arc. It is dimensioned to be placed behind the notch (113) in a gap formed by an annular groove (14) delimited by the skirt (11), the inner wall (13) of the base and partly by the radial wall (12), where it does not have through-openings. Two marks (241, 242) are made in the information wall. The first mark (241) is located facing the notch (113) when the actuator is in the unlocked position, whereas the second mark (242) is located facing the notch when the actuator is in the locked position. The information wall passes behind the notch between these two extreme positions. The marks are chosen so as to symbolize the notion of opening and closing. In the present example, the mark for the unlocked position has the shape of an arrow, whereas the mark for the locked position has the shape of two vertical sticks. Other markings could be chosen, such as the words "ON" and "OFF", or an open padlock and a closed padlock, etc. The marks can be printed on the information wall or be engraved (recessed) or molded in it (protruding). For greater visibility, preferably, the marks pass through the information wall, revealing behind them the inner wall (13) of the skirt. If the cap and the base do not have the same color, the mark stands out better thanks to a contrasting effect.

Limiting means are provided to limit the relative rotational movement of the cap in the base between the two extreme positions. In the example presented here, when the actuator is in the locked position, the end (243) of the information wall located near the unlocked position mark (241) bears against an abutment (141) made on the base, in the bottom of the groove (14). To limit the rotation in the other direction, a second stop could be provided which would cooperate with the other end of the information wall. In the present example, a guide wall (25) has been provided which has a transverse cross-section in the shape of a circular arc around the main axis (A). The information wall (24) and the guide wall (25) extend in different angular sectors so that they do not overlap. A space is provided between the first end (243) of the information wall and the adjacent first end (251) of the angular guide wall. This first end (251) of the guide wall is dimensioned to come to bear against the abutment (141) when the actuator is placed in the unlocked position. The angular distance between the first end (243) of the information wall and the first end (251) of the guide wall corresponds to the angular distance between the two extreme positions. It could be provided that the two walls (24, 25) meet at their ends opposite the first ends (243, 251), thus forming a single wall in the shape of a circular arc, interrupted only by the space provided between these two ends (243, 251).

An extra thickness (231) can be placed on the inner wall, the information wall or the guide wall of the cap, and two extra thicknesses (132, 133) can be placed on the inner wall of the base. They are placed so that the extra thickness of the cap (231) must pass over one of the two extra thicknesses (132, 133) of the base to reach each of the two extreme positions. The cap is thus blocked in the corresponding extreme position and cannot leave it alone. The effort required to make the two extra thicknesses (231/132, 231/133) pass each other is however easily surmountable by hand. In the example presented here, the extra thickness of the cap (231) is placed on the inner face of the inner wall (23), in the angular sector located between the two ends (243, 251) serving as limiting means, while the two extra thicknesses (132, 133) of the base are placed on the outer face of the inner wall (13), on either side and at equal distance from the abutment (141). The angular distance between the two extra thicknesses (132, 133) of the base is slightly less than the angular distance between the two ends (243, 251) serving as limiting means. It is self-evident that it would have been possible to place two extra thicknesses on the cap and only one on the base.

A blade (26) can be placed on the inner wall, the information wall, or the guide wall of the cap, in the same radial position as the extra thickness (232) of the cap, but on the opposite face of the wall in question. This blade (26) penetrates into the groove (14) deep enough to come in contact with the abutment (141) during the rotation of the cap. As the rotation continues, the blade deforms until it passes the abutment and causes a light clicking sound, indicating to the user that the actuator has left one position and is moving towards the other.

Decoupling means are provided to make it possible to separate the endpiece (31) from the rod of the stem when passing from the unlocked position to the locked position. For this, an inclined ramp (123) is provided on the radial wall (12) of the base, and a rib (223) is provided on the inner face of the finger pad (221). During the rotation from the unlocked position to the locked position, the rib (223) comes to slide on the ramp (123) which raises it, and with it, the finger pad (221) and the outlet conduit (30). This is clearly visible in FIGS. 5*a* and 5*b*.

The outlet opening (32) of the outlet conduit (30) is placed above the base, so that it remains permanently unobstructed, regardless of the position of the notch (113).

The invention can be applied, not only to actuators with a finger pad articulated on a cap, but also to actuators whose finger pad is fixed relative to the cap so that the entire cap pivots around a bearing point when the user presses on its top face.

These indication means can also be means of communication for the mark bearer to the consumer thanks to a possible selection of choices of symbols and colors which can be contrasted. In addition, the locked and unlocked positions are physically better delimited, and since reaching one or the other of the positions is better felt and/or visualized by the consumer, the device becomes more reliable and more secure during use.

The invention can be generalized to openings for dispensing a product without the necessary presence an extraction device strictly speaking. It is sufficient if a cap rotates around a base to close or open an outlet opening. Thus, the indication means can be used for a system for opening and closing a vial, a bottle or a flexible pouch that stands upright (of the Doypack® type).

LIST OF REFERENCES

- 1 Actuator
- 10 Base
  - 11 Skirt
    - 111 Upper edge
    - 112 Fixing means
    - 113 Notch
  - 12 Radial wall
    - 121 Passage opening
    - 122 Through-openings
    - 123 Inclined uncoupling ramp
  - 13 Inner wall
    - 131 Retaining means
    - 132 1st extra thickness
    - 133 2nd extra thickness
  - 14 Annular groove
    - 141 Abutment serving as relative rotation limiting means
- 20 Cap
  - 21 Skirt
    - 211 Lower edge
    - 212 Depression
  - 22 Top wall
    - 221 Finger pad
    - 222 Hinge
    - 223 Uncoupling rib
  - 23 Inner wall
    - 231 Retaining means
    - 232 Extra thickness
  - 24 Information wall
    - 241 Unlocked position mark
    - 242 Locked position mark 243 1st end serving as relative rotation limiting means 25 Guidewall 251 1st end serving as relative rotation limiting means 26 Blade 30 Outlet conduit for the product 31 Endpiece/Actuating member 32 Outlet opening 33 Annular channel A Main axis

The invention claimed is:

1. Dispensing device for dispensing a product from an extraction device of a container, comprising:

a base;

a cap comprising a finger pad allowing the extraction device of the container to be actuated; and an outlet conduit provided at a first end with an actuating member intended to cooperate with the extraction device of the container when the finger pad is actuated, and at a second end with an outlet opening, the cap being rotatably mounted on the base so as to be rotatable relative to the base around a main axis between an unlocked position in which the actuating member of the outlet conduit can open the extraction device of the container when the finger pad is actuated, and a locked position in which the actuating member of the outlet conduit cannot open the extraction device even when the finger pad is actuated, indicating means being provided to indicate to a user a relative position of the cap with respect to the base, wherein the indicating means comprise:

a notch or an opening made in one of the base or the cap; and an information wall placed in another of the cap or the base, so that the information wall is located behind the notch or opening, inside the dispensing device, regardless of the relative position of the cap with respect to the base between the locked position and the unlocked position, the information wall having a first, unlocked position mark and a second, locked position mark, the first mark facing the notch or opening when the cap is in the unlocked position and the second mark facing the notch or opening when the cap is in the locked position, wherein the one of the base or the cap which is provided with the notch or opening comprises an inner wall which extends at least behind the notch or opening, leaving a gap between the notch or opening and the inner wall, gap in which the information wall takes place, and the marks pass through a thickness of the information wall so as to reveal the inner wall behind the marks when the marks are aligned with the notch or opening.

2. Dispensing device according to claim 1, wherein the notch or opening is made in an outer skirt of the base or of the cap.

3. Dispensing device according to claim 1, wherein limiting means are provided to limit a relative rotation of the cap with respect to the base to two extreme positions defined by the locked position and the unlocked position.

4. Dispensing device according to claim 3, wherein the other of the base or the cap provided with the information wall comprises a guide wall extending in an angular sector relative to the main axis different from an angular sector relative to the main axis in which the information wall extends, an end of the guide wall facing a first end of the information wall serving as rotation limiting means, the end of the guide wall bearing against an abutment when the cap is in the unlocked or locked position.

5. Dispensing device according to claim 1, wherein the outlet conduit is fixed to an inner face of the finger pad.

6. Dispensing device according to claim 1, wherein the outlet conduit is fixed to the base.

7. Dispensing device according to claim 1, wherein the actuating member of the outlet conduit comprises an endpiece configured to cooperate with a rod of a stem of a male valve or a seat of a female valve of a pressurized container.

8. Dispensing device according to claim 1, wherein blocking means are provided to block the relative rotation of the cap with respect to the base when the cap is in the unlocked position and/or in the locked position.

9. Dispensing device according to claim 1, wherein the dispensing device is provided with fixing means for fixing the dispensing device to the container.

10. Dispensing device according to claim 9, wherein the fixing means is for fixing the base to the container.

11. Dispensing device according to claim 8, wherein the blocking means comprise one or more extra thicknesses made on one of the base or the cap and one or more extra thicknesses made on the other of the base or the cap.

12. Dispensing device according to claim 2, wherein the notch or opening is made in an edge of the outer skirt directed towards the other of the base or the cap, which is provided with the information wall.

13. Dispensing device according to claim 1, wherein a color of the information wall is in contrast relative to a color of the inner wall.

14. Dispensing device according to claim 1, wherein the rotation limiting means comprise a first end of the information wall and the abutment made in the one of the base or the cap which is provided with the notch or opening, the first end of the information wall bearing against the abutment when the cap is in the locked or unlocked position.

15. Dispensing device according to claim 2, wherein the outlet conduit is fixed to an inner face of the finger pad.

16. Dispensing device according to claim 3, wherein the outlet conduit is fixed to an inner face of the finger pad.

17. Dispensing device according to claim 2, wherein the notch or opening is a notch made on an edge of the outer skirt of the base or of the cap.

18. Dispensing device according to claim 2, wherein the notch or opening is an opening located at a distance from an edge of the outer skirt of the base or of the cap.

19. Dispensing device for dispensing a product from an extraction device of a container, comprising:

a base;

a cap comprising a finger pad allowing the extraction device of the container to be actuated; and an outlet conduit provided at a first end with an actuating member intended to cooperate with the extraction device of the container when the finger pad is actuated, and at a second end with an outlet opening, the cap being rotatably mounted on the base so as to be rotatable relative to the base around a main axis between an unlocked position in which the actuating member of the outlet conduit can open the extraction device of the container when the finger pad is actuated, and a locked position in which the actuating member of the outlet conduit cannot open the extraction device even when the finger pad is actuated, indicating means being provided to indicate to a user a relative position of the cap with respect to the base, wherein the indicating means comprise:

a notch or an opening made in one of the base or the cap; and an information wall placed in another of the cap or the base, so that the information wall is located behind the notch or opening, inside the dispensing device, regardless of the relative position of the cap with respect to the base between the locked position and the unlocked position, the information wall having a first, unlocked position mark and a second, locked position mark, the first mark facing the notch or opening when the cap is in the unlocked position and the second mark facing the notch or opening when the cap is in the locked position, wherein limiting means are provided to limit a relative rotation of the cap with respect to the base to two extreme positions defined by the locked position and the unlocked position, wherein the other of the base or the cap provided with the information wall comprises a guide wall extending in an angular sector relative to the main axis different from an angular sector relative to the main axis in which the information wall extends. an end of the guide wall facing a first end of the information wall serving as rotation limiting means, the end of the guide wall bearing against an abutment when the cap is in the unlocked or locked position.

20. Dispensing device for dispensing a product from an extraction device of a container, comprising:

a base;

a cap comprising a finger pad allowing the extraction device of the container to be actuated; and an outlet conduit provided at a first end with an actuating member intended to cooperate with the extraction device of the container when the finger pad is actuated, and at a second end with an outlet opening, the cap being rotatably mounted on the base so as to be rotatable relative to the base around a main axis between an unlocked position in which the actuating member of the outlet conduit can open the extraction device of the container when the finger pad is actuated, and a locked position in which the actuating member of the outlet conduit cannot open the extraction device even when the finger pad is actuated, indicating means being provided to indicate to a user a relative position of the cap with respect to the base, wherein the indicating means comprise:

a notch or an opening made in one of the base or the cap; and an information wall placed in another of the cap or the base, so that the information wall is located behind the notch or opening, inside the dispensing device, regardless of the relative position of the cap with respect to the base between the locked position and the unlocked position, the information wall having a first, unlocked position mark and a second, locked position mark, the first mark facing the notch or opening when the cap is in the unlocked position and the second mark facing the notch or opening when the cap is in the locked position, wherein blocking means are provided to block a relative rotation of the cap with respect to the base when the cap is in the unlocked position and/or in the locked position.

21. Dispensing device according to claim 20, wherein the blocking means comprise one or more extra thicknesses made on one of the base or the cap and one or more extra thicknesses made on the other of the base or the cap.

* * * * *